Oct. 8, 1929. J. L. DEVON 1,730,453

MANIFOLD

Filed April 6, 1927

Joseph L. Devon
INVENTOR

BY Victor J. Evans
ATTORNEY

WITNESS

Patented Oct. 8, 1929

1,730,453

UNITED STATES PATENT OFFICE

JOSEPH L. DEVON, OF ATLANTA, GEORGIA

MANIFOLD

Application filed April 6, 1927. Serial No. 181,489.

This invention relates to an inlet manifold for internal combustion engines, the general object of the invention being to provide the manifold throughout its length with internal baffles which are so arranged that there is no direct passage for the combustible mixture so that the fuel is thoroughly broken up and mixed with the air and thus a mixture will be delivered to the cylinders which will cause the engine to operate at its maximum efficiency.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
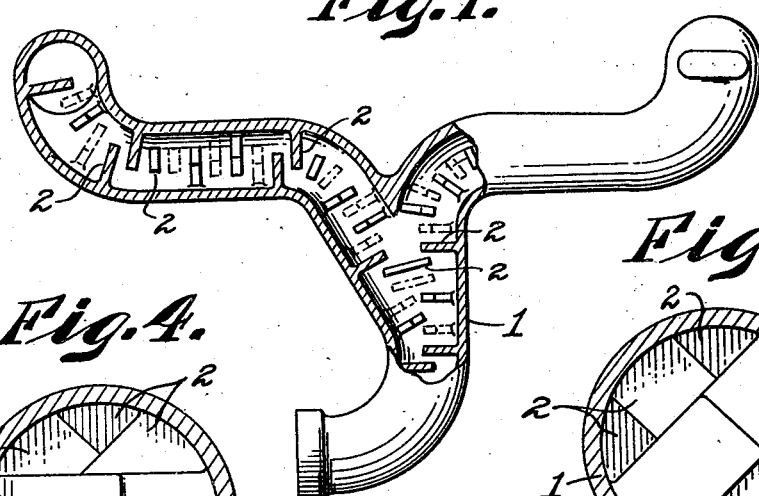
Figure 1 is a view of a manifold constructed in accordance with this invention, parts being in section.
Figure 4:
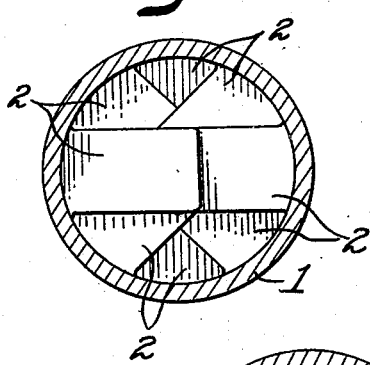
Figure 4 is a section on line 4—4 of Figure 2.
Figure 5:
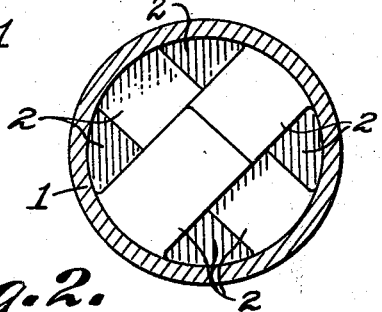
Figure 5 is a section on line 5—5 of Figure 2.
Figure 3:
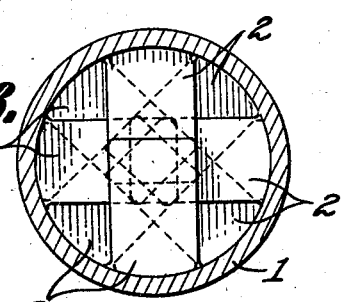
Figure 3 is a section on line 3—3 of Figure 2.
Figure 2:
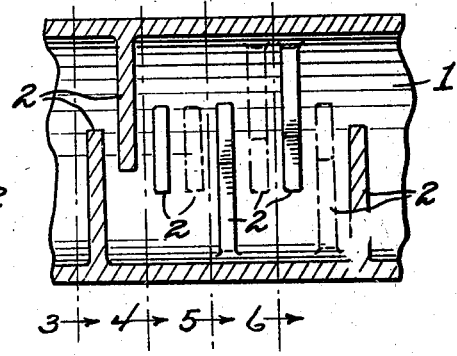
Figure 2 is an enlarged sectional view through a portion of the manifold.
Figure 6:
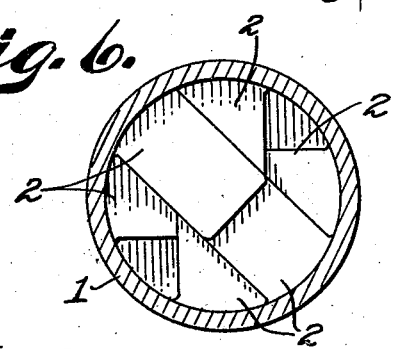
Figure 6 is a section on line 6—6 of Figure 2.

As shown in these views, the manifold 1 is formed with internal baffles or fins 2 which are cast integral with the manifold and these baffles extend inwardly from the walls of the manifold. These baffles are preferably arranged in pairs, as shown in the drawings, with the members of each pair being connected with opposite sides of the manifold, with their free ends overlapping and with the members of each pair spaced apart. Each baffle has the edges of its fastened end substantially in alignment with the edges of adjacent baffles, as shown in Figures 4 and 5, so that as a portion of the stream of combustible mixture passes the substantially triangular space between two baffles, it will strike another baffle so that the mixture is prevented from passing through the manifold in a straight path or a spiral one, and thus it will be broken up into a number of streams which will comingle and this action will continue from the time the mixture enters the manifold until it passes from the manifold. Thus the mixture of fluid and air will be thoroughly combined, and the particles of fluid will be broken up into minute parts. By having the baffles arranged on the entire length of the manifold, possibilities of the fluid separating from the air is avoided, which will take place if the baffles did not extend the full length of the manifold.

From the foregoing it will be seen that the mixture is thoroughly broken up and held in suspension until it passes into the cylinders, where it is ignited, so that the combustibility of the mixture is greatly increased. With this invention, a saving of fuel is secured, due to the perfect mixture of the fuel and air and this invention renders the use of a heating device unnecessary, though, of course, one may be used, if desired.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A manifold of the class described having baffles formed integral with its internal walls, the baffles being arranged in longitudinally extending rows extending from one end of the device to the other, with each row diametrically opposite another row, with the baffles of each pair of rows arranged in pairs, the baffles of each pair being slightly spaced apart, with their inner ends overlapping, alternate rows of baffles being arranged a quarter turn from each other and all the baffles being of rectangular shape with the baffles in alternate rows extending across the space between the baffles of the other alternate rows whereby the fluid passing through the device is prevented from following a straight path or a spiral one.

In testimony whereof I affix my signature.

JOSEPH L. DEVON.